US012601423B2

(12) United States Patent
Qiu

(10) Patent No.: US 12,601,423 B2
(45) Date of Patent: Apr. 14, 2026

(54) CONTROL VALVES WITH ADJUSTABLE VALVE PACKING

(71) Applicant: Fisher Controls International LLC, Marshalltown, IA (US)

(72) Inventor: Yan Qiu, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/532,699

(22) Filed: Dec. 7, 2023

(65) Prior Publication Data

US 2025/0189058 A1    Jun. 12, 2025

(51) Int. Cl.
*F16K 41/04*          (2006.01)
*F16K 3/02*           (2006.01)
(Continued)

(52) U.S. Cl.
CPC ............ *F16K 41/04* (2013.01); *F16K 3/0227* (2013.01); *F16K 3/0236* (2013.01); *F16K 3/0254* (2013.01); *F16K 3/0263* (2013.01); *F16K 3/243* (2013.01); *F16K 5/0663* (2013.01); *F16K 5/0668* (2013.01); *F16K 5/0673* (2013.01); *F16K 5/0678* (2013.01); *F16K 5/0684* (2013.01); *F16K 5/0689* (2013.01); *F16K 5/0694* (2013.01); *F16K 37/0083* (2013.01);
(Continued)

(58) Field of Classification Search
CPC ...... F16K 41/02; F16K 41/023; F16K 41/026; F16K 41/04; F16K 41/043; F16K 41/046; F16K 41/066; F16K 41/063; F16K 41/06;
F16K 41/083; F16K 41/08; F16K 41/086; F16K 3/0236; F16K 3/0227; F16K 3/243; F16K 5/0694; F16K 5/0663; F16K 5/0668; F16K 5/0673; F16K 5/0678; F16K 5/0689; F16K 3/0254; F16K 3/0263
See application file for complete search history.

(56) References Cited

U.S. PATENT DOCUMENTS 3,921,264 A * 11/1975 Madonian ................ H02K 7/10
                                                              475/349
5,129,625 A      7/1992 Wood et al.
(Continued)

FOREIGN PATENT DOCUMENTS

DE      102014015889 A1 * 5/2016      ......... F16K 37/0041
JP         S63275875 A * 11/1988
WO    WO-2022154171 A1 * 7/2022

*Primary Examiner* — Atif H Chaudry
(74) *Attorney, Agent, or Firm* — Hanley, Flight & Zimmerman, LLC

(57)          ABSTRACT

An example apparatus is disclosed herein comprising a valve that includes a valve body defining a fluid passageway between an inlet and an outlet, a flow control member in the fluid passageway, a stem coupled to the flow control member, and a bonnet coupled to the valve body. The stem extends through a channel in the bonnet. A section of the channel forms a bore. The bore is threaded. The apparatus includes packing in the channel to form a seal between the bonnet and the stem. The apparatus includes a worm wheel nut threadably engaged with the bore. The stem extends through an opening in the worm wheel nut. The apparatus also includes a worm meshed with the worm wheel nut. The worm is to rotate the worm wheel nut to cause the worm wheel nut to move and adjust a load on the packing.

19 Claims, 10 Drawing Sheets

(51) Int. Cl.

| | |
|---|---|
| *F16K 3/24* | (2006.01) |
| *F16K 5/06* | (2006.01) |
| *F16K 37/00* | (2006.01) |
| *F16K 41/02* | (2006.01) |
| *F16K 41/06* | (2006.01) |
| *F16K 41/08* | (2006.01) |

(52) U.S. Cl.
CPC ............ *F16K 41/02* (2013.01); *F16K 41/023* (2013.01); *F16K 41/026* (2013.01); *F16K 41/043* (2013.01); *F16K 41/046* (2013.01); *F16K 41/06* (2013.01); *F16K 41/063* (2013.01); *F16K 41/066* (2013.01); *F16K 41/08* (2013.01); *F16K 41/083* (2013.01); *F16K 41/086* (2013.01)

(56) References Cited

U.S. PATENT DOCUMENTS

| | | | |
|---|---|---|---|
| 9,835,267 B2 | 12/2017 | Giove et al. | |
| 2021/0207738 A1* | 7/2021 | Kitchens | .............. F16K 41/026 |

* cited by examiner

100

318
806
808
122
802
804

206

CONTROLLER
CIRCUITRY
800

124

1000

120

1004

110

120

1002

306

CONTROL VALVES WITH ADJUSTABLE VALVE PACKING

FIELD OF THE DISCLOSURE

This disclosure relates generally to process control devices and, more particularly, to control valves with adjustable valve packing.

BACKGROUND

Control valves are commonly distributed throughout process control systems to control the flow of various fluids (e.g., liquids, gases, etc.). Control valves can vary in size and operating conditions (e.g., operating pressures, operating temperatures, operating fluids, etc.). Control valves are often operated by movement of a shaft or stem that extends through a bonnet of the valve. Valve packing is used to seal the opening surrounding the shaft or stem to prevent fluid leakage.

SUMMARY

An example apparatus is disclosed herein comprising a valve that includes a valve body defining a fluid passageway between an inlet and an outlet, a flow control member in the fluid passageway, a stem coupled to the flow control member, and a bonnet coupled to the valve body. The stem extends through a channel in the bonnet. A section of the channel forms a bore. The bore is threaded. The apparatus includes packing in the channel to form a seal between the bonnet and the stem. The apparatus includes a worm wheel nut threadably engaged with the bore. The stem extends through an opening in the worm wheel nut. The apparatus also includes a worm meshed with the worm wheel nut. The worm is to rotate the worm wheel nut to cause the worm wheel nut to move and adjust a load on the packing.

An example apparatus is disclosed herein comprising a valve that includes a valve body defining a fluid passageway between an inlet and an outlet, a flow control member in the fluid passageway, a stem coupled to the flow control member, and a bonnet coupled to the valve body. The bonnet defines a channel in the bonnet. The stem extends through the channel in the bonnet. The apparatus includes a packing in the channel to form a seal between the bonnet and the stem. The apparatus also includes a motor that, when activated, changes an axial load on the packing.

An example method is disclosed herein comprising accessing a parameter value from sensor data that is output by a sensor of a control valve system. The control valve system includes a valve. The value includes a packing. The method further includes comparing the parameter value to a threshold, and activating a motor to adjust a load on the packing when the parameter value satisfies the threshold.

Figure 1:
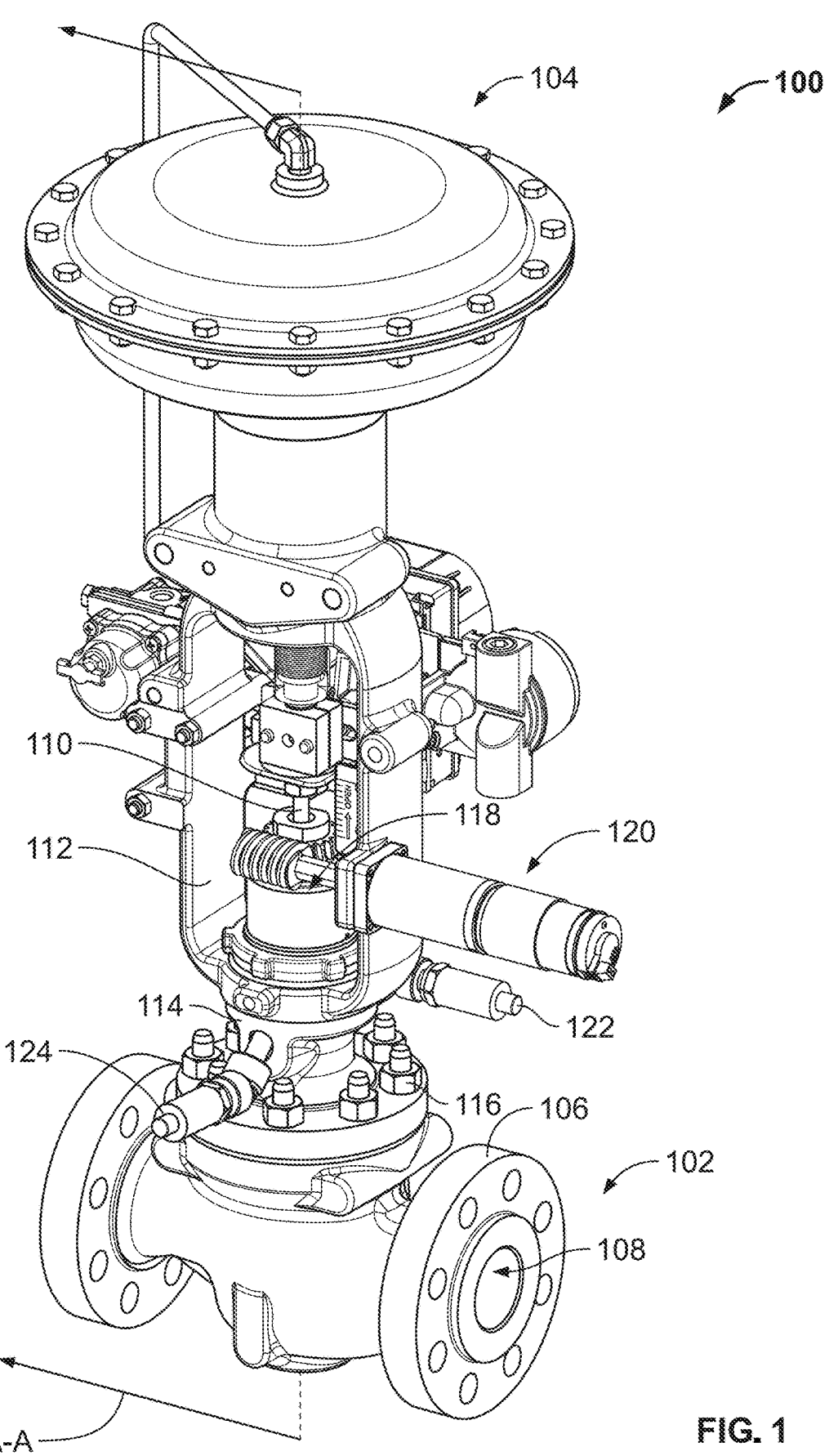
FIG. 1 is a perspective view of an example control valve system including an example valve and an example actuator.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Emissions from valves and other process control devices due to insufficient sealing can be an issue for end users, such as operators of oil and gas refineries, chemical and petrochemical plants, as well as regulators across the globe. The Environmental, Social, and Governance (ESG) movement has gained traction in recent years, with many companies engaging in ESG improvements. Fugitive emissions (e.g., uncontrolled or unanticipated emissions) refers to the unintentional and undesirable emission, leakage, or discharge of gases/vapors from pressure-containing equipment or facilities (e.g., a control valve system). These emissions are unanticipated and, as such, may not detected by typical monitoring and control devices. Aging assets going through many cycles, incorrect technology choice, and valve sizing, often escalate emissions. Government regulations, health and safety programs, and increasing public pressure is urging end users, valve manufacturers and suppliers, and process industry operators/contractors to reduce emissions.

Packing load is an important factor affecting packing sealing performance. Disclosed herein are example systems for automatically adjusting of a packing load on a control valve system that detects and reduces packing seal emissions or leaks. Disclosed systems, apparatus, articles of manufacture, and methods include an electronically controlled packing load adjuster for monitoring emissions or leaks in the packing and instructing a controller to adjust a packing load to prevent or reduce such emissions or leaks.

FIG. 1 illustrates an example control valve system 100, which includes an example valve 102 and an example actuator 104 for operating the valve 102. The example control valve system 100 may also be referred to as a control valve assembly or actuator valve assembly. The valve 102 includes a valve body 106 defining a fluid passageway 108. The valve 102 can be operated to control a flow of fluid through the fluid passageway 108. The valve 102 includes a flow control member (e.g., the flow control member 306 of FIG. 3) in the fluid passageway 108. The flow control member is moveable between an open position and a closed position to allow or block fluid flow through the fluid passageway 108. The valve 102 includes a stem 110 coupled to the flow control member. The stem 110 is coupled to and operated by the actuator 104. The actuator 104 can move the stem 110 (e.g., in a linear direction) to move the flow control member and thereby affect the flow of fluid through the fluid passageway 108. In the illustrated example, the control valve system 100 includes a yoke 112 that couples the valve 102 and the actuator 104. As shown in FIG. 1, the stem 110 extends upward from the valve 102, through the yoke 112, and is connected to the actuator 104. For example, the stem 110 may be coupled to an actuator stem via a stem connector.

In the illustrated example of FIG. 1, the valve 102 includes a bonnet 114 that is coupled to the valve body 106. In the example of FIG. 1, the bonnet 114 is coupled to the valve body 106 via a plurality of threaded fasteners 116 (e.g., nuts and bolts). However, any alternative fastener may be used such as rivets, screws, and welds. In some examples, the bonnet 114 is a single piece of material (e.g., continuous or forged/milled from a single piece of material). In other examples, the bonnet 114 is constructed of multiple pieces that are fastened/coupled together. The bonnet 114 may be considered a portion of the valve body 106. In this example, the bonnet 114 is removably coupled to the rest of the valve body to enable assembly of the flow control member and other components in the fluid passageway 108.

The stem 110 extends through the bonnet 114 and into the fluid passageway 108. In particular, the bonnet 114 includes a channel 118 (e.g., an opening, a passage, etc.). The stem 110 extends through the channel 118 and into the fluid passageway 108 where the stem 110 is coupled to the flow control member. The valve 102 includes a packing, shown in further detail herein, in the channel 118. The packing forms a low friction, pressure tight seal between the stem 110 and the bonnet 114 to prevent fluid from leaking through the channel 118 and out of the valve 102.

In the illustrated example, the control valve system 100 includes an example packing load adjustment system 120. The packing load adjustment system 120 can be used to adjust a load (e.g., pressure) applied to the packing in the channel 118. Adjusting the load affects the sealing pressure, and can therefore be used to prevent or reduce possible emissions or leakage during certain operating conditions. The packing load adjustment system 120 is disclosed in further detail herein.

The example control valve system 100 can include one or more sensors to detect or measure various parameters of the control valve system 100. Based on these measurements, the packing load adjustment system 120 may adjust (e.g., increase or decrease) the load on the packing. For example, the example control valve system 100 includes a first emission sensor 122 and a second emission sensor 124. As shown in other figures herein, the first emission sensor 122 measures emission levels at a first location in the bonnet 114. Likewise, the second emission sensor 124 measures emission levels at a second location in the bonnet 114, different than the first location. If one of the emissions sensors 122, 124 detects emissions or leakage through the channel 118, for example, the packing load adjustment system 120 may increase the load on the packing to tighten the seal and thereby prevent or reduce further emissions. Although two emission sensors are shown in FIG. 1, it should be understood that a single emission sensor may be used or more than two emission sensors may be used.

In examples disclosed herein, the first emission sensor 122 also includes a temperature sensor. The temperature sensor is used to monitor a temperature of the packing or a fluid in the channel 118. In operation, the control valve system 100 may be subjected to changes in atmospheric pressure and operating temperatures, which could lead to changes in the packing load applied by the devices within the packing load adjustment system 120 (e.g., due to expansion and contraction of materials). In other examples, the temperature sensor can be separate from the first emission sensor 122, included with a different emission sensor (e.g., the second emissions sensor 124), or omitted altogether.

Figure 2:
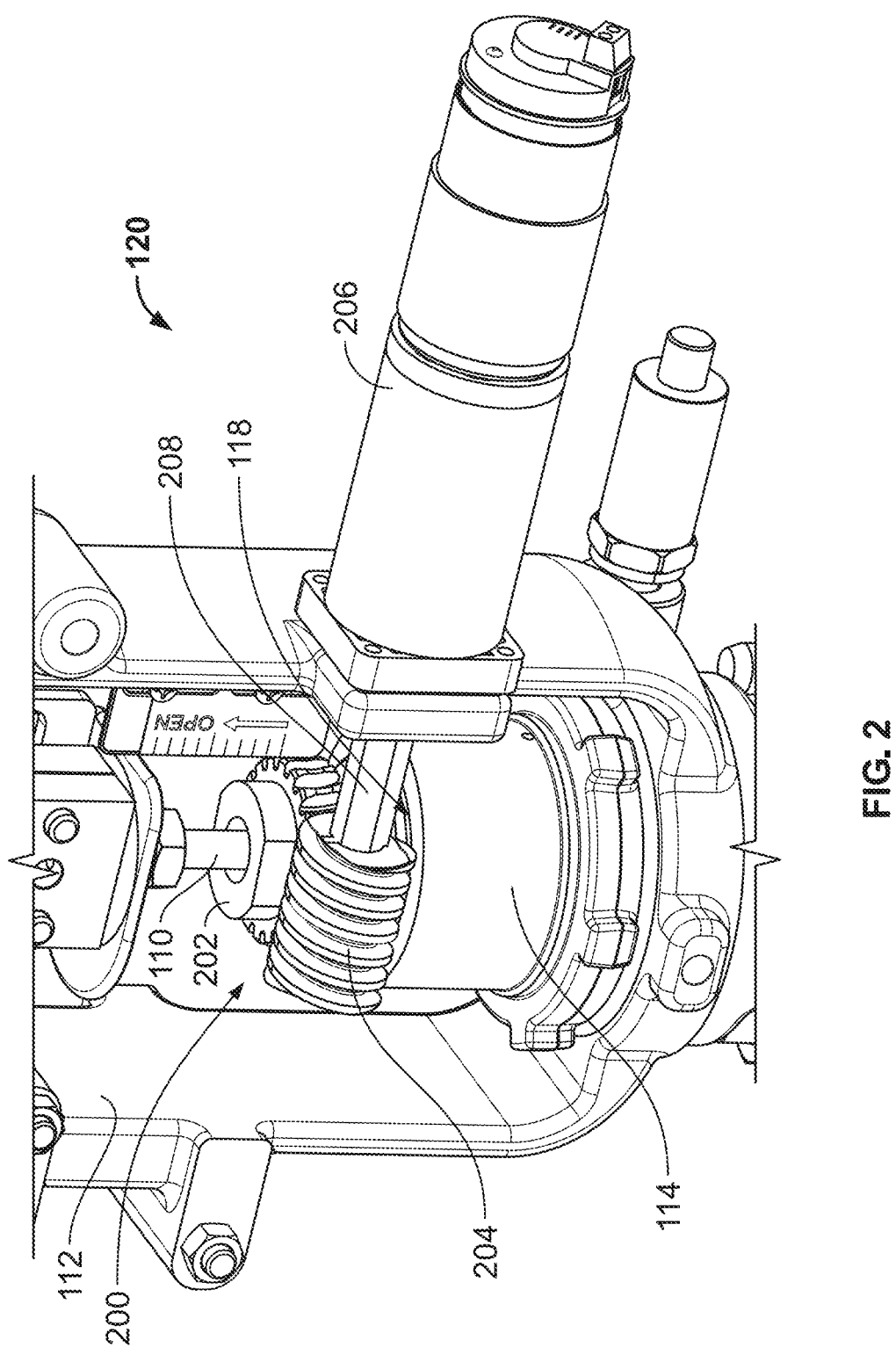
FIG. 2 is an enlarged view of the example control valve system of FIG. 1 showing an example packing load adjustment system of the example control valve system.

FIG. 2 is an enlarged view of the packing load adjustment system 120 of FIG. 1. In the illustrated example, the packing load adjustment system 120 includes a worm gear arrangement 200 used to apply load (e.g., pressure) to the packing in the bonnet 114. The worm gear arrangement 200 includes a worm wheel nut 202 and a worm 204. The worm 204 is meshed with the worm wheel nut 202. The worm 204 can be driven to rotate the worm wheel nut 202. In the illustrated example, the worm wheel nut 202 is partially disposed in the channel 118 of the bonnet 114. As shown in further detail herein, the worm wheel nut 202 is threaded into the channel 118. Therefore, rotation of the worm 204 cause the worm wheel nut 202 to move linearly (e.g., up and down) and adjust a load on the packing. In some examples, the worm gear arrangement 200 is also referred to as a gear assembly consisting of the worm wheel nut 202 and the worm 204. While the gear assembly shown includes a worm gear, alternate gear combinations may be used herein such as a spur gear assembly, a rack and pinion mechanism, a screw gear assembly, etc.

Worm gear arrangements (e.g., the worm wheel nut 202 and the worm 204) are advantageous because they provide a relatively high gear reduction ratio, which results in high torque multiplication. A high torque multiplication enables greater output torque in response to a relatively small input torque compared to typical gear arrangements. Worm gear arrangements also reduce or limit backdrive of the input or drive gear. Limiting backdrive increases position control of an output device coupled to the worm gear by reducing undesired gear movement to keep the output device in place at a desired position. Therefore, worm gear assemblies are beneficial for their high torque output and limited backdrive.

In the illustrated example, the packing load adjustment system 120 includes an electric motor 206 with an output or drive shaft 208. The worm 204 is coupled to (e.g., formed integrally with, via threaded fasteners, via friction fit) the drive shaft 208. The electric motor 206 can be activated to drive the drive shaft 208, which rotates the worm 204 and thereby drives the rotation of the worm wheel nut 202. As the worm wheel nut 202 rotates, the worm wheel nut 202 moves further into or out of the channel 118, thereby increasing or decreasing the packing load. Increasing the packing load increases the sealing pressure in the channel 118, while decreasing the packing load decreases the sealing pressure in the channel 118.

In operation, fluid (e.g., natural gas, oil, etc.) is contained in the fluid passageway 108 of the valve 102 (FIG. 1). This fluid can escape the valve 102 via the channel 118 if not tightly sealed. Loading the packing can result in a tighter seal. In particular, increasing an axial load on the packing causes the packing to compress and expand radially. This results in a tighter seal between the stem 110 and the inner surface of the channel 118. Conversely, reducing the axial load on the packing relaxes or reduces the sealing pressure.

In some examples, increasing the packing load beyond what is necessary to reduce/eliminate emissions can cause undesired stresses and/or a reduction in a dynamic performance of the control valve system 100. For example, increasing the packing load to a relatively high packing load increases the friction between the packing 312 and the stem 110, which can reduce the ability for the control valve system 100 to finely control the position of the flow control member 306.

The electric motor 206 allows for adjustment of the packing load without the need for an operator/user to manually adjust the packing load. In some examples, the electric motor 206 is controlled through an external device (e.g., a computing device) such as a controller, a phone/tablet/computer, etc. Example controller circuitry is disclosed in further detail in connection with FIG. 8. In the illustrated example, the electric motor 206 is coupled to the yoke 112. For example, the electric motor 206 can be coupled to the yoke 112 via one or more threaded fasteners (e.g., bolts, screws, etc.). However, in other examples, the motor 206 can be coupled to another structure, such as the valve body 106 or the actuator 104.

While the examples disclosed herein refer to an electric motor 206 to modify the packing load, other devices can be used for adjusting the packing load. Examples include, but are not limited to, an actuator (e.g., linear actuator), a hydraulic motor, a pneumatic motor, or any combination of the preceding.

Figure 3:
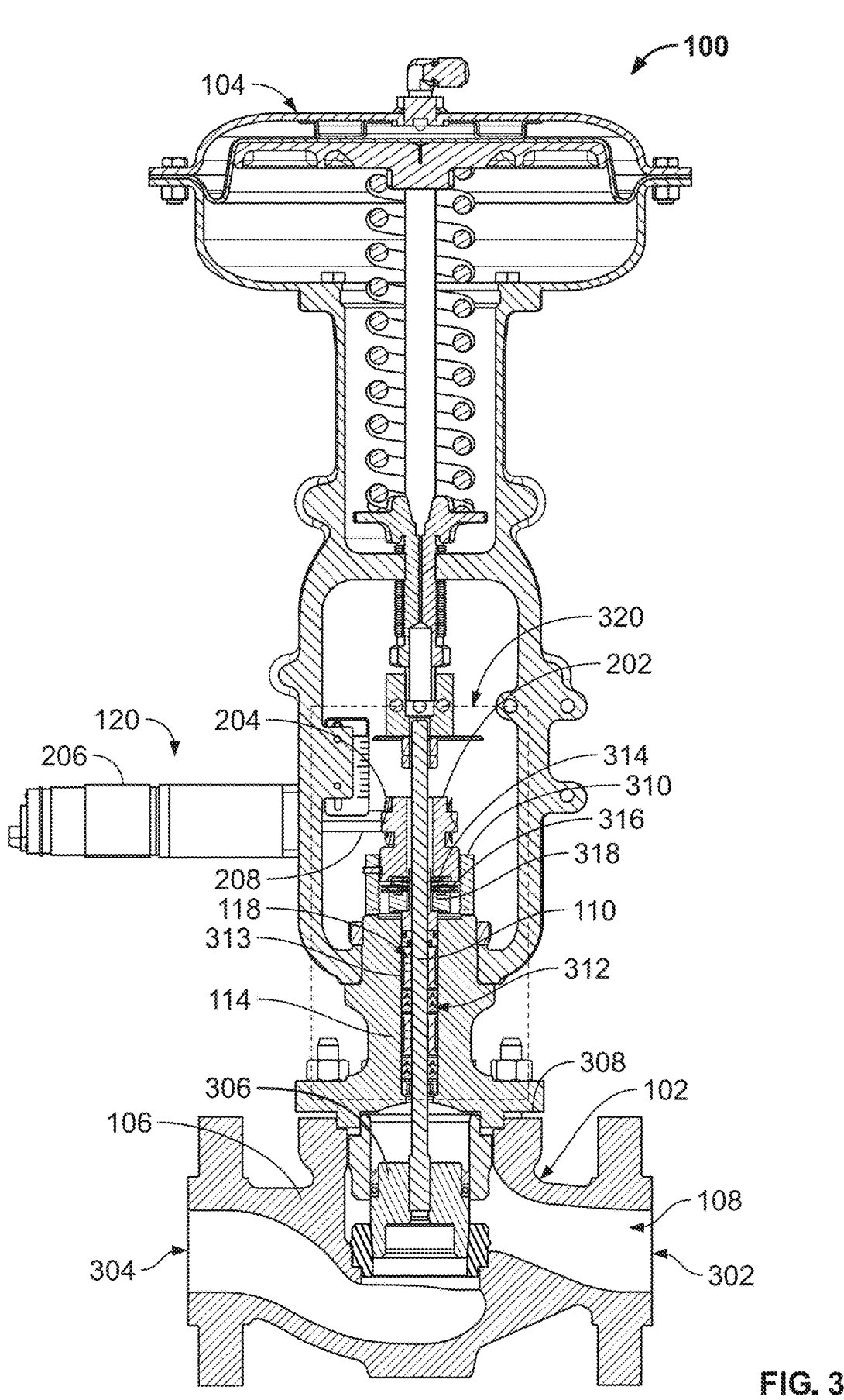
FIG. 3 is a cross-sectional view of the example control valve system of FIG. 1.

FIG. 3 is a cross-sectional view of the example control valve system 100 taken along the A-A line as shown in FIG. 1. As shown in the example of FIG. 3, the valve body 106 has an inlet 302 and an outlet 304, and the fluid passageway 108 connects the inlet 302 and the outlet 304. Fluid enters the fluid passageway 108 through the inlet 302 and exits the fluid passageway 108 through the outlet 304. In the illustrated example, the valve 102 includes a flow control member 306 used to control the amount of fluid that flows through the fluid passageway 108 from the inlet 302 to the outlet 304. The flow control member 306 is moveable between a closed position and an open position. When the flow control member 306 is in the closed position, the flow control member 306 blocks fluid flow between the inlet 302 and the outlet 304. When the flow control member 306 is in the open position, at least some fluid flows from the inlet 302 to the outlet 304. The flow control member 306 can be moved to various positions ranging from fully closed to fully open to regulate the amount of fluid flow.

As illustrated in FIG. 3, the bonnet 114 has a first side 308 and a second side 310. The first side 308 is oriented towards the fluid passageway 108. The second side 310 is opposite the first side 308 and facing toward the actuator 104. The channel 118 extends through the bonnet 114 between the first side 308 and the second side 310. As shown in FIG. 3, the stem 110 extends through the channel 118 and is coupled to the flow control member 306 in the fluid passageway 108.

In examples disclosed herein, the control valve system 100 includes a packing 312 for preventing or reducing fluid leaks (e.g., emissions) through the channel 118. The packing 312 is disposed in the channel 118 of the bonnet 114. In examples disclosed herein, the packing 312 includes two spacers (e.g., a first spacer 416A and a second spacer 416B) and two seals (e.g., a first seal 418A and a second seal 418B). The spacer 416A, 416B of the packing 312 is composed of a metal such as aluminum. The seal 418A, 418B of the packing 312 is composed of one or more materials that form a seal between the stem 110 and an inner surface 313 of the channel 118, while still enabling the stem 110 to move smoothly through the channel 118. Examples of materials that can be used as the seal 418A, 418B of the packing 312 include polytetrafluoroethylene (PTFE), graphite, duplex configurations, which include a combination of PTFE and graphite, or Ultra High Molecular Weight Polyethylene (UHMWPE).

Generally, increasing the axial load on the packing 312 causes the packing 312 to expand radially and form a tighter seal between the stem 110 and an inner surface 313 of the channel 118. This reduces or eliminates possible air channels through which emissions can leak. Conversely, reducing the load on the packing 312 relaxes the seal between the stem 110 and the inner surface 313 of the channel 118.

In the illustrated example, the worm wheel nut 202 is partially disposed in the channel 118. The worm wheel nut 202 can be moved up or down in the channel 118 to affect the packing load. In the illustrated example of FIG. 3, the packing load adjustment system 120 includes a spring 314. The spring 314 is disposed in the channel 118 between the worm wheel nut 202 and the packing 312. In examples disclosed herein, the spring 314 is a Belleville spring. However, alternate springs may be used.

In examples disclosed herein, the packing 312 expands as temperatures increase (e.g., internal temperatures or external/ambient temperatures). In such an example, the spring 314 compresses to allow the packing 312 to expand without the need to change the packing load.

In some examples, the spring 314 is used to dampen the packing load applied. Damping the packing load includes allowing flexibility in the direction in which the packing load is applied. In some examples, the packing load adjustment system 120 overshoots the desired packing load and the spring 314 allows for the packing load to overshoot and settle on the desired packing load. Such an example may be desired to reduce an impact of the packing load to components within the control valve system 100. For example, if the packing load is changed nearly instantaneous (e.g., a relatively small time difference to adjust the packing load), some components might experience increased material decay (e.g., cracking, deformation, creep, etc.). To avoid such material decay, the spring 314 can increase the time over which the packing load is changed.

In the illustrated example, the packing load adjustment system 120 includes a thrust bearing 316. In some examples, the thrust bearing 316 utilizes a series of plates with rollers disposed between the plates to allow components on either side of the thrust bearing 316 to rotate smoothly under an axial load. The spring 314, as it rotates freely, may produce friction when the worm wheel nut 202 is rotated to increase/decrease the packing load. The thrust bearing 316 reduces friction between the spring 314 and components in contact with the spring 314. In some examples, the thrust bearing 316 maintains an alignment of the stem 110 within the channel 118 of the bonnet 114 (e.g., prevents or reduces lateral movement of the stem 110 with respect to the channel 118).

In the illustrated example, the packing load adjustment system 120 includes a load sensor 318. The load sensor 318 measures the packing load applied (e.g., axial load, pressure). In examples disclosed herein, the load sensor 318 is a donut load cell for measuring a compression load. The donut load cell allows the stem 110 to pass through the donut load cell while still being able to measure a compressive load. In other examples, the load sensor 318 can be any kind of sensor capable of measuring a force such as a pressure transducer, a strain gauge, a force sensing resistor, etc. As disclosed in further detail herein, the packing load adjustment system 120 may adjust (e.g., increase or decrease) the load on the packing based on measurements from the load sensor 318.

In some examples, the packing load adjustment system 120 omits the load sensor 318. In such an example, the packing load adjustment system 120 adjusts the packing load based on an analysis of the emission sensors 122, 124 and/or any other sensors included in the control valve system 100. Such an example may be desired in space-constrained environments.

Figure 4:
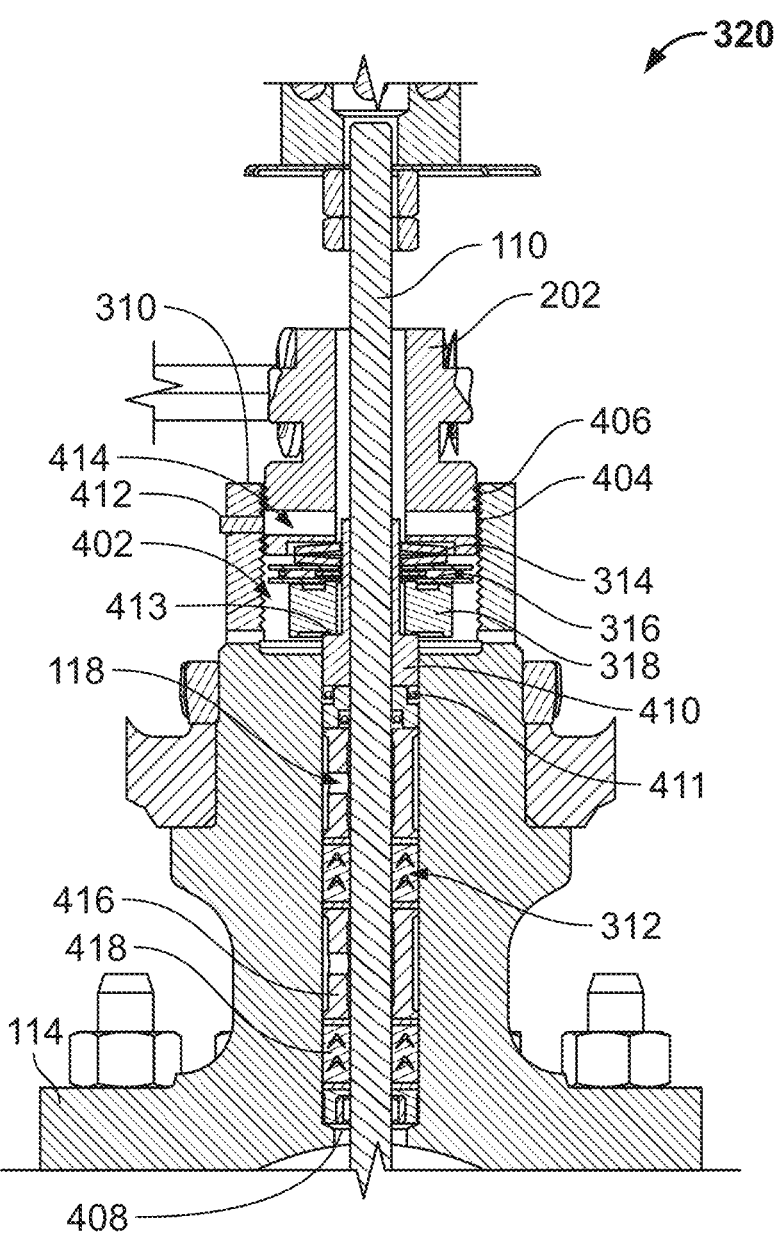
FIG. 4 is a cross-sectional view of the example packing load adjustment system of FIG. 3.

FIG. 4 is an enlarged view of the callout 320 of FIG. 3. As shown in FIG. 4, the packing 312 surrounds the stem 110 within the channel 118 (e.g., circumferentially surrounds an outer surface of the stem 110 outwards to the wall of the channel 118). In the illustrated example, the lower or bottom end of the packing 312 is axially constrained by a shoulder 408 in the channel 118 of the bonnet 114. The shoulder 408 prevents the packing 312 from being ejected into the fluid passageway 108 (FIG. 1).

In the example of FIG. 4, the upper portion of the channel 118 is enlarged and forms a bore 402 at the second side 310. The bore 402 houses (e.g., surrounds) the worm wheel nut 202, the spring 314, the thrust bearing 316, and the load sensor 318.

In examples disclosed herein, the bore 402 is threaded. The bore 402 includes a first threading 404 on an inner surface of the bore 402. The worm wheel nut 202 includes a second threading 406 on an outer surface of the worm wheel nut 202 that is meshed with the first threading 404. Therefore, the worm wheel nut 202 is threadably engaged with (e.g., screwed into) the bore 402. As such, rotation of the worm wheel nut 202 causes the worm wheel nut 202 to move up or down in the bore 402. In some examples, the bore 402 is only threaded in an upper section (e.g., above the spring 314). In other examples, the bore 402 is entirely threaded. As shown in FIG. 4, the stem 110 extends through the worm wheel nut 202. In some examples, the stem 110 is spaced from an inner surface of the worm wheel nut 202, such that the stem 110 and the worm wheel nut 202 are not in contact.

In the illustrated example, the packing load adjustment system 120 includes a packing load connector 410 in the channel 118. The stem 110 extends through the packing load connector 410. As shown in FIG. 4, the top of the packing load connector 410 extends into a stem channel (e.g., the stem channel 506 of FIG. 5) of the worm wheel nut 202, and the bottom of the packing load connector 410 is engaged with the packing 312. Linear movement of the worm wheel nut 202 causes the packing load connector 410 to move linearly in the channel 118 and thereby increase or decrease the load on the packing 312. A seal 411 (or bushing) is disposed around a bottom portion of the packing load connector 410 to create a seal between the bore 402 and the channel 118. As shown in FIG. 4, the spring 314 is disposed around the packing load connector 410. The spring 314 is axially slidable along the packing load connector 410. The spring 314 is also rotatable about the packing load connector 410.

In examples disclosed herein, the packing load connector 410 moves independently of the stem 110. In such examples, the actuator 104 moves the stem 110 axially within the channel 118 and the packing load connector 410 is moved when the worm wheel nut 202 is rotated by the motor 206 (FIG. 2) to adjust the packing load. Since the worm wheel nut 202 is not coupled/connected to the stem 110, the stem 110 and the packing load connector 410 move independently of each other.

In the illustrated example, the load sensor 318 is disposed between a shoulder 413 on the packing load connector 410 and the thrust bearing 316. Therefore, as shown in FIG. 4, the spring 314, the thrust bearing 316, and the load sensor 318 are axially clamped or constrained between the worm wheel nut 202 and the shoulder 413. The worm wheel nut 202, the spring 314, the thrust bearing 316, the load sensor 318, and the packing load connector 410 are coaxial with the stem 110. To increase the load on the packing 312, the worm wheel nut 202 is rotated in a first direction, which causes the worm wheel nut 202 to move further into the bore 402 and toward the packing 312. The worm wheel nut 202 engages and compresses the spring 314 against the thrust bearing 316. This downward force is transferred through the thrust bearing 316 and the load sensor 318 to the packing load connector 410. This causes the packing load connector 410 to slide downward in the channel 118 and thereby increase the load on the packing 312. Conversely, to reduce the load on the packing 312, the worm wheel nut 202 can be rotated in a second direction that causes the worm wheel nut 202 to move away from the packing 312. The packing 312 may expand (e.g., in the axial direction), which forces the packing load connector 410, the load sensor 318, the thrust bearing 316, and the spring 314 upward.

In the example of FIG. 4, the thrust bearing 316 is disposed between the spring 314 and the load sensor 318. As disclosed above, the thrust bearing 316 enables components within the packing load adjustment system 120 to rotate freely. For example, when the worm wheel nut 202 rotates, the worm wheel nut 202 is engaged with and may cause the spring 314 to rotate about the packing load connector 410. However, the packing load connector 410 and the load sensor 318 may not rotate. Therefore, the thrust bearing 316 enables the spring 314 to rotate smoothly relative to the load sensor 318 and the packing load connector 410.

In some examples, the packing load adjustment system 120 can include a retention feature to limit the vertical/axial travel of the worm wheel nut 202. For example, in FIG. 4, the packing load adjustment system 120 includes a stop pin 412. The stop pin 412 extends through a wall of the bonnet 114 and into a stop pin groove 414 in the worm wheel nut 202. In some examples, the stop pin groove 414 has a larger width (in the vertical/axial direction in FIG. 4) than the diameter of the stop pin 412. As such, the stop pin 412 provides upper and lower bounds for movement of the worm wheel nut 202. For example, the worm wheel nut 202 may move axially within the bore 402 and the stop pin 412 will engage with a top or a bottom portion of the stop pin groove 414 to limit the travel of the worm wheel nut 202 within the bore 402.

In some examples, the packing 312 consists of one spacer (e.g., the first spacer 416A or the second spacer 416B) and one seal (e.g., the first seal 418A or the second seal 418B). In examples disclosed herein, more than one spacer (e.g., the first spacer 416A and the second spacer 416B) and more than one seal (e.g., the first seal 418A and the second seal 418B) is utilized. The spacer 416A/416B provides a structural surface between the seal 418A/418B and surrounding structure of the control valve system 100 (e.g., the inner surface 313 of the channel 118, the packing load connector 410, etc.). The seal 418A/418B compresses and expands to form a seal on the inner surface 313 as the packing load is applied.

Figures 5, 6, 7:
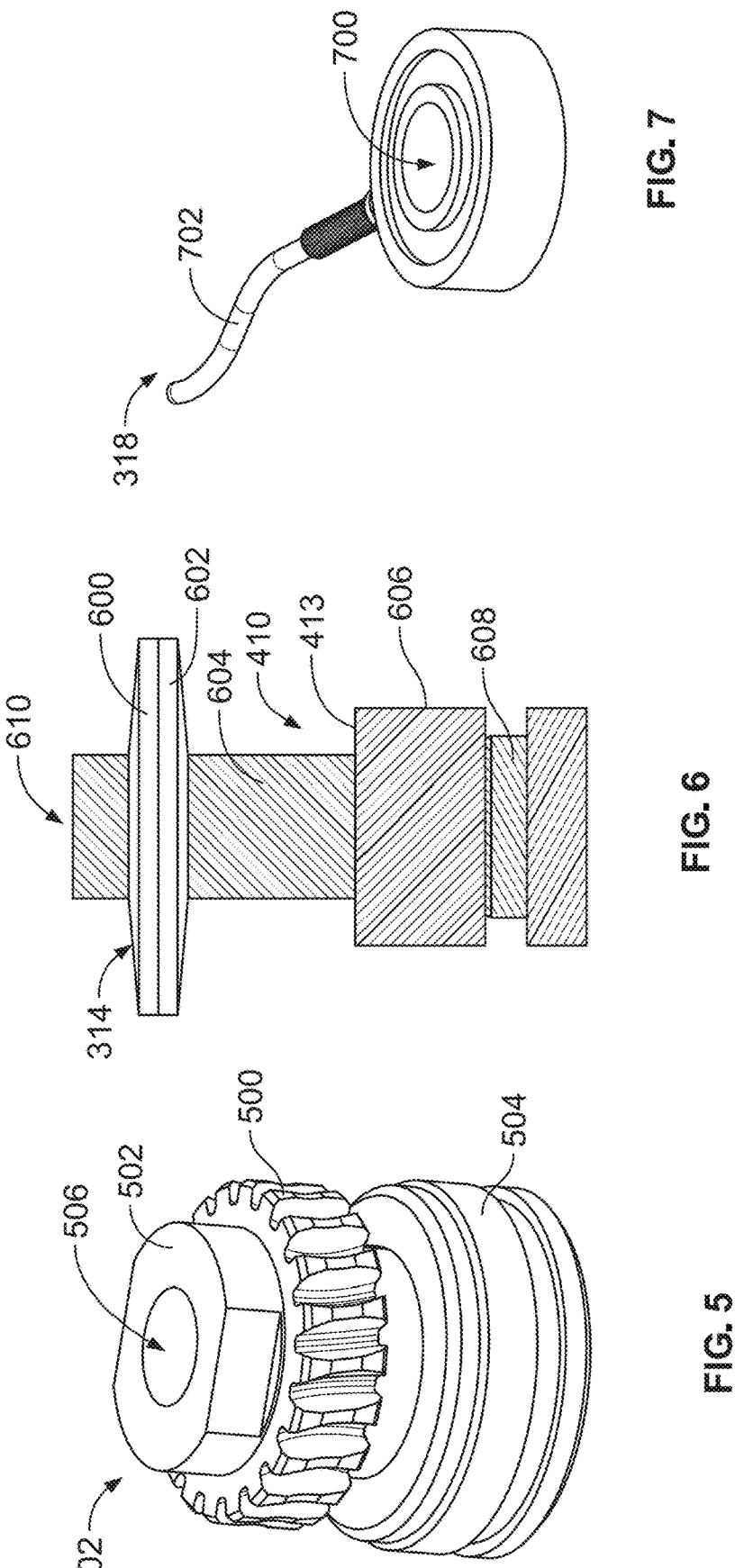
FIG. 5 illustrates an example worm wheel nut of the example packing load adjustment system of FIG. 4.
FIG. 6 illustrates an example spring and corresponding spring connector of the example packing load adjustment system of FIG. 4.
FIG. 7 illustrates an example load sensor of the example packing load adjustment system of FIG. 3.

FIG. 5 is a perspective view of the worm wheel nut 202 of FIGS. 2-4. The worm wheel nut 202 includes teeth 500 for meshing with the worm 204. The number of teeth used on the worm wheel nut 202 corresponds to a desired gear ratio for the movement of the worm 204 relative to the worm wheel nut 202. For example, a larger number of teeth 500 increases the input rotations required of the worm 204 for the worm wheel nut 202 to travel a certain distance within the bore 402.

The example of FIG. 5 includes a first shaft portion 502 and a second shaft portion 504, which may be coupled or integrally formed. The teeth 500 extend outward from the first shaft portion 502. In examples disclosed herein, the second shaft portion 504 is threaded to engage with threads in the bore 402 (disclosed in reference to FIG. 4). The second shaft portion 504 being threaded allows for controlled movement of the worm wheel nut 202 within the bore 402. The worm wheel nut 202 defines a stem channel 506 that allows the stem 110 to extend through the worm wheel nut 202.

FIG. 6 is a perspective view of the spring 314 and the packing load connector 410 of FIG. 4. In the example of FIG. 6, the spring 314 is a Belleville spring and includes a top spring plate 600 and a bottom spring plate 602 which are coupled together at their outer radial edges. The top spring plate 600 and the bottom spring plate 602 are oppositely convex-shaped to allow the top spring plate 600 and the bottom spring plate 602 to compress or expand to dampen the packing load applied.

The packing load connector 410 includes the shoulder 413, a top connector portion 604, a bottom connector portion 606, and a seal groove 608. The top connector portion 604 extends through the spring 314. The spring 314 is able to rotate relative to the top connector portion 604 and slide axially along the top connector portion 604.

When the packing load adjustment system 120 is assembled, the top connector portion 604 extends through the load sensor 318, and the load sensor 318 is engaged with a top of the bottom connector portion 606 (e.g., the shoulder 413). In examples disclosed herein, abutting the load sensor 318 with the shoulder 413 allows the load sensor 318 to measure a compressive force applied to the packing 312 by the worm wheel nut 202. For example, the worm wheel nut 202 compresses the spring 314 which compresses a top portion of the load sensor 318 in contact with the spring 314 through the thrust bearing 316. The load sensor 318 then compresses against the shoulder 413. Thus, the load sensor 318 is compressed (or oppositely decompressed when the packing load is reduced) to measure the compressive force applied to the packing 312.

The bottom connector portion 606 abuts with the packing 312. As discussed above, the packing load connector 410 enables the packing load applied to be applied to the packing 312. In some examples, the bottom connector portion 606 is shaped to have minimal contact tolerances (e.g., small enough to allow the packing load connector 410 to move axially within the channel 118) between the channel 118 and the edges of the bottom connector portion 606. The seal groove 608 is a section of the bottom connector portion 606 that houses the seal 411 of FIG. 4. In examples disclosed herein, the packing load connector 410 includes a stem channel 610 allowing the stem 110 to extend through the packing load connector 410.

FIG. 7 is a perspective view of the load sensor 318 of FIGS. 3 and/or 4. The load sensor 318 is disc shaped and has a stem channel 700 allowing the stem 110 to extend through the load sensor 318. The load sensor 318 can measure load in the axial direction. In the example of FIG. 7, the load sensor 318 includes an electrical connector 702 extending out from the load sensor 318. The electrical connector 702 is used to transmit data to and from the load sensor 318. For example, the electrical connector 702 communicates the active/current load being applied to the packing 312. In other examples, the electrical connector 702 also receives instructions to periodically check the active/current load being applied.

Figure 8:
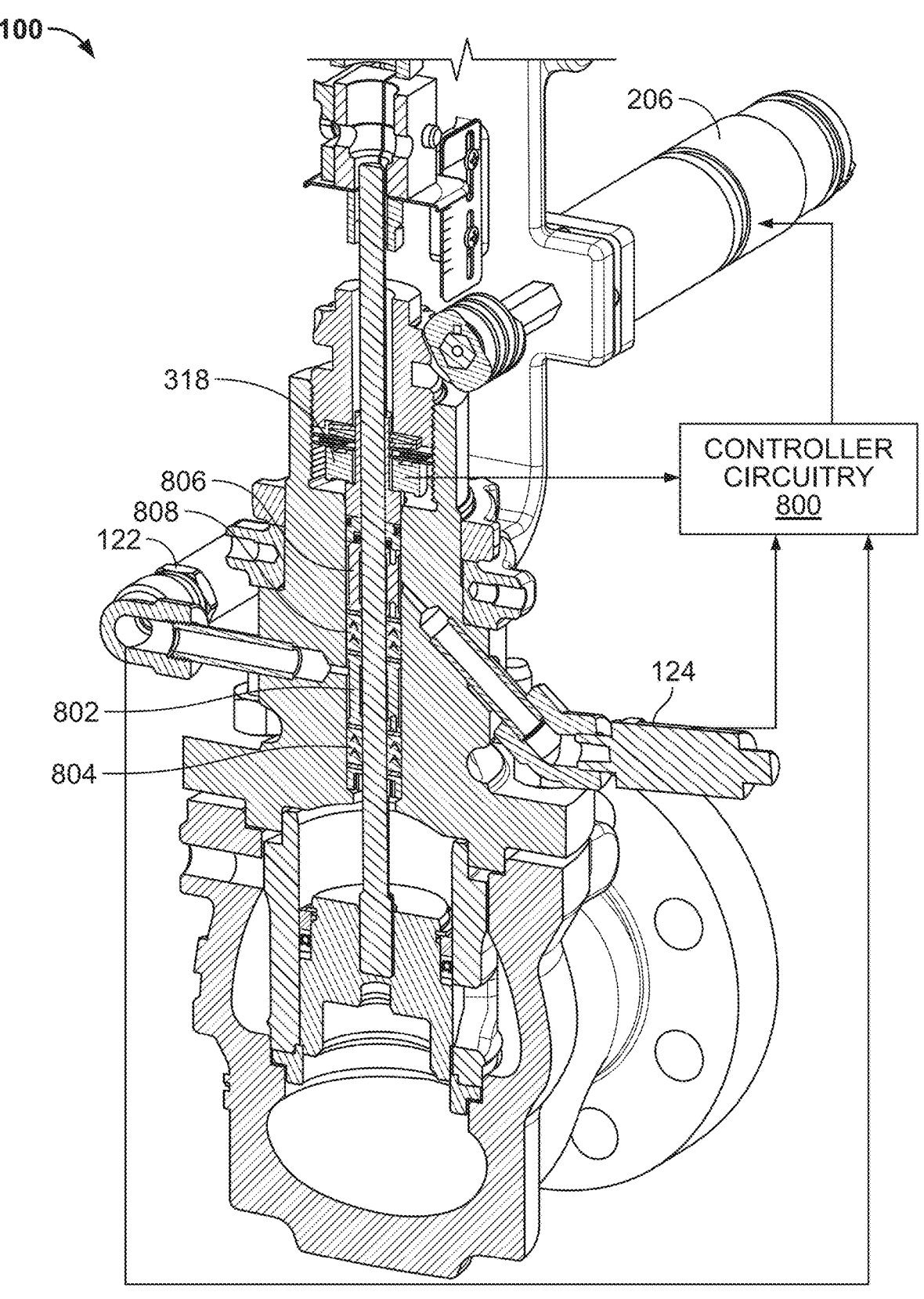
FIG. 8 is a schematic drawing of the example control valve system of FIGS. 1-4 including example controller circuitry to control a packing load.

FIG. 8 is a schematic drawing of the example control valve system 100 of FIGS. 1-4 implementing example controller circuitry 800 to control the packing load through operation of the electric motor 206. The controller circuitry 800 of FIG. 8 may be instantiated (e.g., creating an instance of, bring into being for any length of time, materialize, implement, etc.) by programmable circuitry such as a Central Processor Unit (CPU) executing first instructions. Additionally or alternatively, the controller circuitry 800 of FIG. 8 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that the controller circuitry 800 of FIG. 8 may, thus, be instantiated at the same or different times. The controller circuitry 800 of FIG. 8 may be instantiated, for example, in one or more threads executing concurrently on hardware and/or in series on hardware. Moreover, in some examples, the controller circuitry 800 of FIG. 8 may be implemented by microprocessor circuitry executing instructions and/or FPGA circuitry performing operations to implement one or more virtual machines and/or containers.

The example of FIG. 8 includes the first emission sensor 122, the second emission sensor 124, the load sensor 318, and the electric motor 206. Each of the aforementioned are electrically coupled to the controller circuitry 800.

In the example of FIG. 8, the controller circuitry 800 receives output data or measurements from the first emission sensor 122, the second emission sensor 124, the load sensor 318. In some examples, the data includes sensor readings such as emission levels detected, load being applied to the packing 312, etc. It should be understood that more or fewer sensors could be included in the example of FIG. 8, including different sensors such as a temperature sensor, a strain gauge, etc.

In operation, the first emission sensor 122 measures emission values at a first location in the channel 118. Such values or data is transmitted to the controller circuitry 800 (e.g., wired or wireless).

In some examples, the location of the first emission sensor 122 is based on the location of the spacer 416A/416B in the packing 312. In examples disclosed herein, the spacer 416A/416B is positioned distally away from the seal 418A/418B such that the spacer 416A/416B is sealed from any emission leaks if the seal 418A/418B is operating properly.

In the example of FIG. 8, the control valve system 100 includes two spacers (e.g., the first spacer 416A and the second spacer 416B) and two seals (e.g., the first seal 418A and the second seal 418B). For example, the first emission sensor 122 is located at the second spacer 416B closest to the flow control member 306. In such an example, the second seal 418B is present between the shoulder 408 of the bonnet 114 and the second spacer 416B. Locating the first emission sensor 122 at the second spacer 416B allows the first emission sensor 122 to monitor a status of the second seal 418B (e.g., whether the second seal 418B is leaking/not operating properly).

In some examples, a temperature sensor is embedded with the first emission sensor 122. In such an example, the temperature of the packing 312 and/or a gas within the packing 312 is measured. The temperature data is likewise transmitted to the controller circuitry 800 (e.g., wired or wireless).

Likewise, the second emission sensor 124 measures emission values at a second location in the channel 118, which is at a location different than that of the first emission sensor 122. In the example of FIG. 8, the second emission sensor 124 is located at the first spacer 416A closest to the packing load adjustment system 120. The first seal 418A is located between the first spacer 416A and the second spacer 416B. The second emission sensor 124 measures emissions at the first spacer 416A to determine whether the first seal 418A is operating properly.

The load sensor 318, as disclosed above, senses the load being applied to the packing 312. Such load data is also transmitted to the controller circuitry 800 (e.g., wired or wireless).

In the example of FIG. 8, the controller circuitry 800 collects the data from the various sensors and transmits an instruction to the electric motor 206 to either increase or decrease the packing load based on the sensor data. In some examples, the controller circuitry 800 also transmits instructions to the sensors. Such an example may include reducing a frequency for which to transmit the data to the controller circuitry 800.

In examples disclosed herein, the controller circuitry 800 determines whether to increase or decrease the packing load by analyzing the sensor data acquired. In some examples, the controller circuitry 800 also monitors for routine cycles and limits of the control valve system 100. Such examples include routine opening/closing of the flow control member 306, a number of times the packing load has been adjusted, an approved packing load limit based on the materials of the components within the control valve system 100, etc.

While the example packing load adjustment system 120 is disclosed in connection with a valve having a stem that moves linearly, the example packing load adjustment system 120 can be similarly implemented in connection with valves having stems or shafts that rotate. For example, the packing load adjustment system 120 can be implanted in connection with a rotary valve such as a ball valve or butterfly valve. In some examples, rotary valves do not include a bonnet. Instead, the shaft or stem extends through another portion of the body of the rotary valve.

While examples disclosed herein illustrate a single packing load adjustment system 120, two or more packing load adjustment systems 120 could be included. For example, a combination of two or more packing load adjustment systems 120 can provide additional control to the packing load within the channel 118. In one such example, two packing load adjustment systems could be used to apply a packing load at opposite sides of the channel 118. Such an example would allow the packing load to be independently adjustable on either side of the channel 118.

Figure 9:
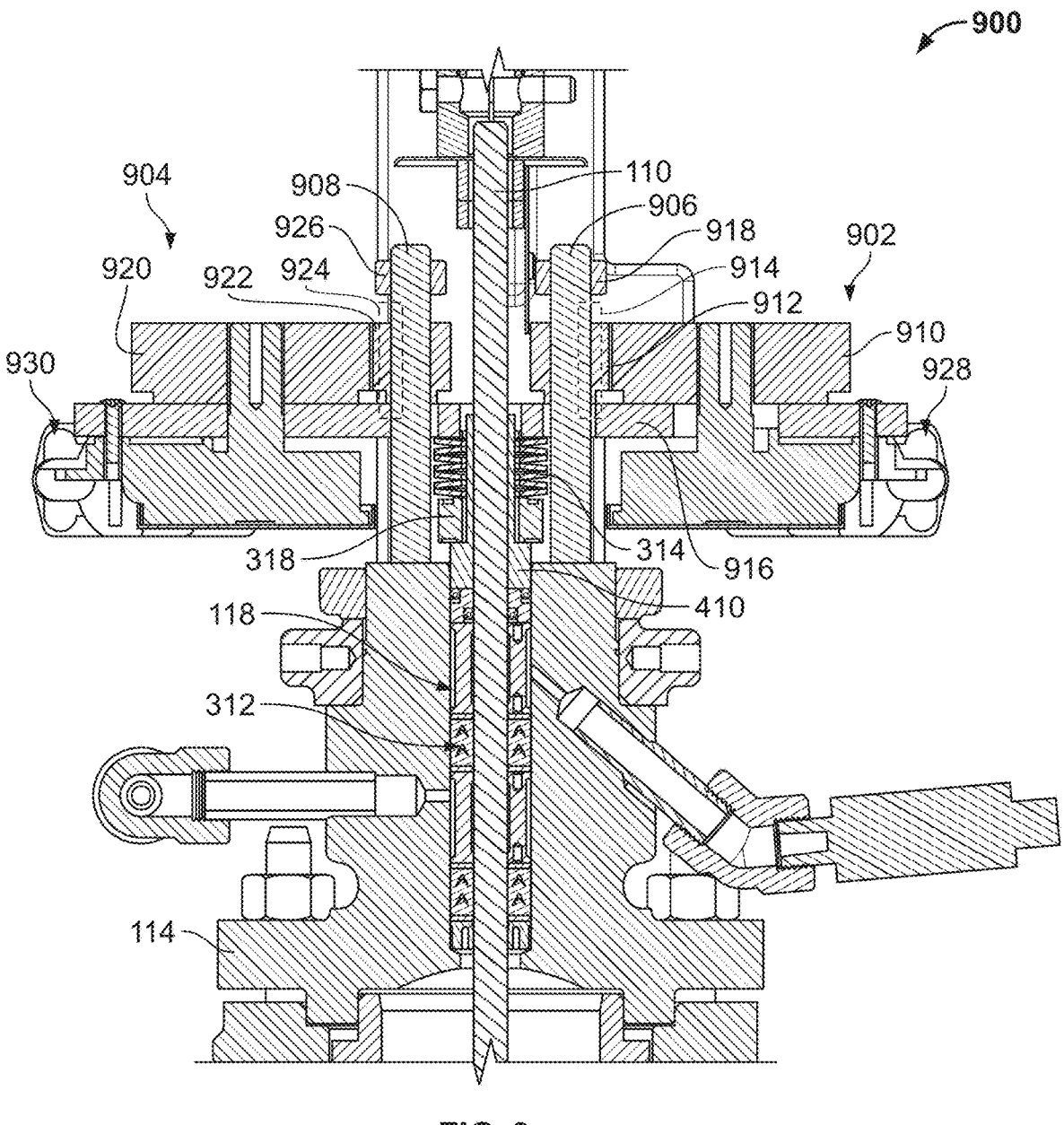
FIG. 9 is a cross-sectional view of an example dual packing load control valve.

FIG. 9 is a cross-sectional view of an example dual packing load control valve 900. The example dual packing load control valve 900 includes the stem 110, the channel 118, the packing 312, the spring 314, and the load sensor 318. In the example of FIG. 9, the control valve 900 includes a first packing load adjustment system 902 and a second packing load adjustment system 904. The first packing load adjustment system 902 includes a first bolt 906 that is embedded in the bonnet 114. The second packing load adjustment system 904 likewise includes a second bolt 908 that is also embedded in the bonnet 114. In the example of FIG. 9, the first bolt 906 and the second bolt 908 do not move with respect to the bonnet 114.

The first packing load adjustment system 902 includes a first gear 910. The first gear drives a second gear 912. The second gear 912 moves axially along the first bolt 906 via first bolt threads 914 embedded in the first bolt 906. As the first gear 910 rotates to increase the packing load, the second gear 912 is compressed against a bracket 916. The bracket 916 abuts against the spring 314. As the second gear 912 is compressed against the bracket 916, the spring 314 is compressed against the load sensor 318, which is compressed against the packing load connector 410, and the axial force is thus transferred into the packing 312 similar to examples disclosed herein.

As the first gear 912 rotates to decrease the packing load, the second gear 912 is decompressed against the bracket 916. In examples disclosed herein, the bracket 916 provides a stop barrier for the second gear 912 to limit a rotation/packing load applied by the first packing load adjustment system 902. Likewise, the first bolt 906 includes a first travel stop 918 for limiting a travel of the second gear 912 in the opposite direction (e.g., when reducing the packing load on the packing 312).

The second packing load adjustment system 904 includes a third gear 920. The third gear 920 drives a fourth gear 922. The fourth gear 922, similar to the second gear 912, moves axially along the second bolt 908 via second bolt threads 924 embedded in the second bolt 908 to compress/decompress with respect to the bracket 916. The third gear 920 controls the packing load applied by the fourth gear 922. The second bolt 908 includes a second travel stop 926 for limiting a travel of the fourth gear 922 in the direction of reducing the packing load.

In the example of FIG. 9, the second gear 912 and the fourth gear 922 are used to adjust the packing load. Compared to other example disclosed herein, the second gear 912 and the fourth gear 922 are not coaxial with the stem 110.

The first packing load adjustment system 902 can operate independently of the second packing load adjustment system 904. For example, the first packing load adjustment system 902 can be operably coupled to a first motor 928 and the second packing load adjustment system 904 can be operably coupled to a second motor 930. In some examples, the first motor 928 and the second motor 930 are independently controllable. For example, the first motor 928 can be activated to increase the packing load applied by the second gear 912. In this example, the second motor 930 can be activated to increase the packing load applied by the fourth gear 922, activated to decrease the packing load applied by the fourth gear 922, or not activated (e.g., the fourth gear 922 does not move).

While the example of FIG. 9 shows two packing load adjustment systems 902, 904, more than two packing load adjustment systems can be implemented according to example disclosed herein. Such examples are not limited to a single or dual packing load adjustment systems.

Figure 10:
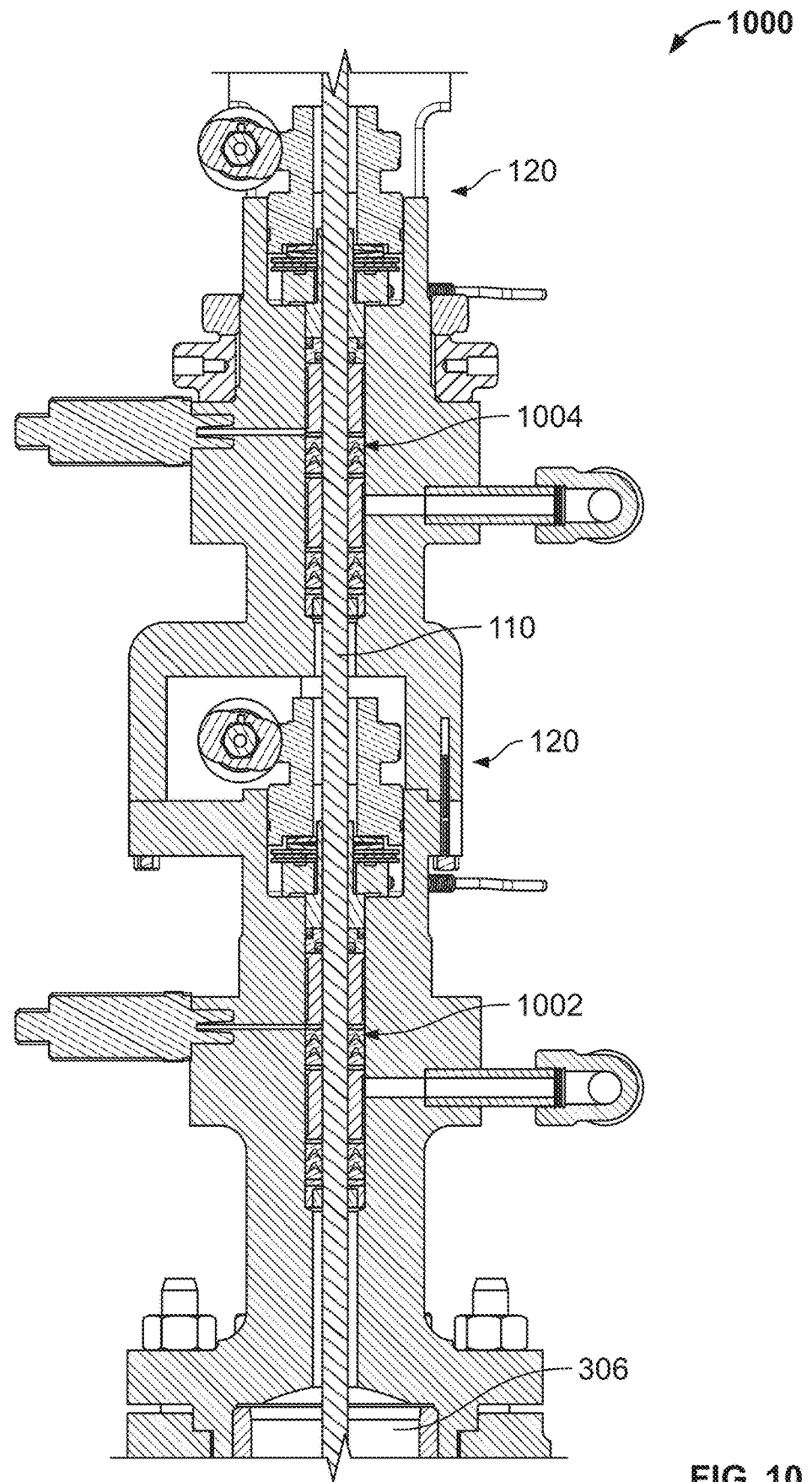
FIG. 10 is a cross-sectional view of an example control valve system utilizing two packing load adjustment systems.

FIG. 10 is a cross-sectional view of an example control valve system utilizing two packing load adjustment systems (e.g., the packing load adjustment system 120 implemented twice). The packing load adjustment systems 120 of FIG. 10 can include any one of or combination of components disclosed herein with respect to the packing load adjustment system 120 (e.g., the worm wheel nut 202, the worm 204, the motor 206, the spring 314, the thrust bearing 316, and/or the load sensor 318). In the example of FIG. 10, the control valve system is a redundant packing control valve 1000. The example redundant packing control valve 1000 of FIG. 10 includes the stem 110, a first packing 1002, and a second packing 1004. In the example of FIG. 10, the first packing 1002 and the second packing 1004 includes at least one spacer (e.g., the first spacer 416A or the second spacer 416B) and at least one seal (e.g., the first seal 418A or the second seal 418B). In some examples, the first packing 1002 and the second packing 1004 includes more than one spacer and more than one seal.

The redundant packing control valve 1000 of FIG. 10 includes two of the packing load adjustment systems 120 as disclosed herein. In the example of FIG. 10, the first packing 1002 is associated with one of the packing load adjustment systems 120 and the second packing 1004 is associated with the other of the packing load adjustment systems 120. It should be understood that more than two packings and more than two packing load adjustment systems could be used accordingly herein.

In operation, the redundant packing control valve 1000 includes two separate packings (e.g., the first packing 1002 and the second packing 1004). Each packing is independently loaded such that the first packing 1002 is loaded to a first packing load and the second packing 1004 is loaded to a second packing load. The first packing load may be different than the second packing load.

In the example of FIG. 10, the stem 110 operates to open and close the flow control member 306, but also extends through both packings 1002, 1004. The first packing 1002 and the second packing 1004 may be composed of the same material or may be composed of different materials depending on the operating environment.

While an example manner of implementing the example control valve system 100 of FIGS. 1-4 is illustrated in FIG. 8, the controller circuitry 800 FIG. 8 may be combined, divided, re-arranged, omitted, eliminated, and/or implemented in any other way. Further, the example controller circuitry 800 may be implemented by hardware alone or by hardware in combination with software and/or firmware. Thus, for example, the example controller circuitry 800 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller circuitry 800 may include one or more elements, processes, and/or devices in addition to, or instead of, those illustrated in FIG. 8, and/or may include more than one of any or all of the illustrated elements, processes and devices.

Figure 11:
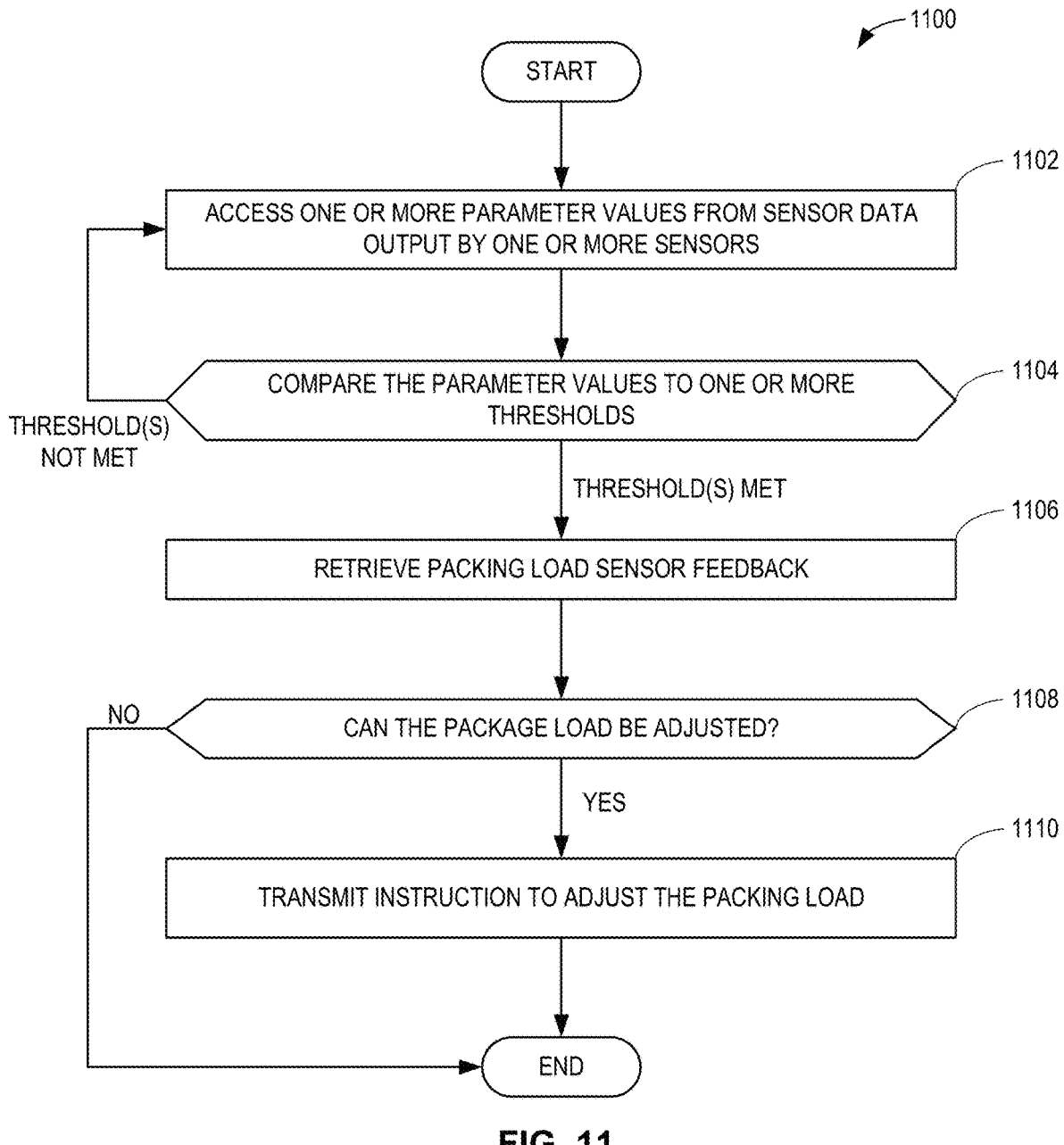
FIG. 11 is a flowchart representative of example machine readable instructions and/or example operations that may be executed, instantiated, and/or performed by example programmable circuitry to implement the controller circuitry of FIG. 8.

A flowchart representative of example machine readable instructions, which may be executed by programmable circuitry to implement and/or instantiate the controller circuitry 800 of FIG. 8 and/or representative of example operations which may be performed by programmable circuitry to implement and/or instantiate the controller circuitry 800 of FIG. 8, is shown in FIG. 11. The machine readable instructions may be one or more executable programs or portion(s) of one or more executable programs for execution by programmable circuitry such as the programmable circuitry 1212 shown in the example processor platform 1200 discussed below in connection with FIG. 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 11, many other methods of implementing the example controller circuitry 800 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 11 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 11 is a flowchart representative of example machine readable instructions and/or example operations 1100 that may be executed, instantiated, and/or performed by programmable circuitry to monitor and respond to errors in the control valve system 100. The example machine-readable instructions and/or the example operations 1100 of FIG. 11 begin at block 1102 at which the controller circuitry 800 accesses one or more parameter values from sensor data output by one or more sensors. The parameter values may be emission values output by the first emission sensor 122 and/or the second emission sensor 124. Additionally or alternatively, the parameter values may include temperature readings from a temperature sensor. In other examples, other types of parameter values can be accessed.

At block 1104, the controller circuitry compares the parameter value(s) to one or more thresholds. This comparison may be used to determine whether an emission leak and/or an excessive temperature event has been detected. In some examples, the controller circuitry 800 determines that an emission leak has been detected due to a drop in pressure within the packing 312. If the parameter value does not satisfy the threshold, control proceeds back to block 1102. For example, if the controller circuitry 800 determines that a leak and/or an excessive temperature event has not been detected (e.g., block 1104 returns a result of THRESHOLD (S) NOT MET), then the controller circuitry 800 continues to monitor the control valve system 100 (e.g., return to block 1102). In some examples, the controller circuitry 800 continually monitors the control valve system 100 as long as the control valve system 100 is in operation.

If the controller circuitry 800 determines the parameter value satisfies (e.g., meets or exceeds) the threshold indicative that, for example, a leak and/or excessive temperature event has been detected (e.g., block 1104 returns a result of THRESHOLD(S) MET), then the controller circuitry 800 retrieves the packing load data from the load sensor 318. (Block 1106). In some examples, the packing load sensed by the load sensor 318 is only retrieved when a warning (e.g., a leak) has been detected. This may be desired to save bandwidth and/or reduce computing resources required to implement the control valve system 100 disclosed herein.

When the controller circuitry 800 retrieves the packing load from the load sensor 318, the controller circuitry determines whether the packing load can be adjusted. (Block 1108). In some examples, the packing load may already be at a maximum (e.g., based on material properties of the components, the travel of the worm wheel nut 202, the stop pin 412 location, etc.). In such an example, the controller circuitry 800 can produce an indicator to inform an operator/ user that a warning event has occurred and cannot be corrected (e.g., a flashing light, a display output, etc.).

If the controller circuitry 800 determines that the packing load can be adjusted (e.g., block 1108 returns a result of YES), the controller circuitry 800 transmits an instruction to adjust the packing load. (Block 1110). For example, the controller circuitry 800 may activate the electric motor 206 to move the worm wheel nut 202 within the bore 402. In other examples, where an electric motor is not used, the controller circuitry 800 may activate or control the appropriate control mechanism for adjusting the packing load (e.g., an actuator, a hydraulic motor, a pneumatic motor, etc.)

If the controller circuitry 800 determines that the packing load cannot be adjusted (e.g., block 1108 returns a result of NO) or when the instruction to adjust the packing load has been transmitted, the example operations 1100 of FIG. 11 end. The example operations 1100 of FIG. 11 can be repeated as necessary while the control valve system 100 is in operation/in use.

Figure 12:
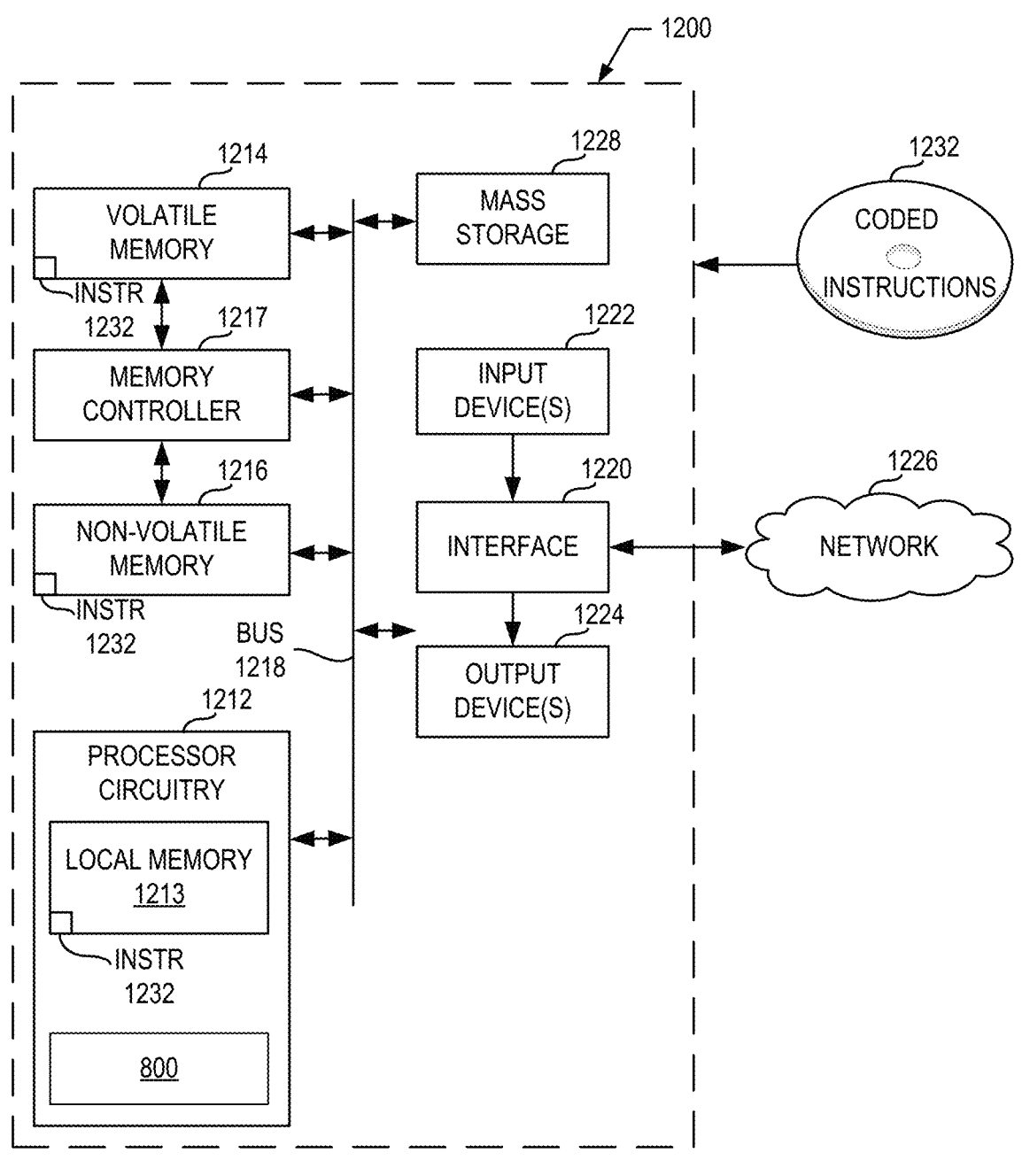
FIG. 12 is a block diagram of an example processing platform including programmable circuitry structured to execute, instantiate, and/or perform the example machine readable instructions and/or perform the example operations of FIG. 11 to implement the controller circuitry of FIG. 8.

FIG. 12 is a block diagram of an example programmable circuitry platform 1200 structured to execute and/or instantiate the example machine-readable instructions and/or the example operations of FIG. 11 to implement the controller circuitry 800 of FIG. 8. The programmable circuitry platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing and/or electronic device.

The programmable circuitry platform 1200 of the illustrated example includes programmable circuitry 1212. The programmable circuitry 1212 of the illustrated example is hardware. For example, the programmable circuitry 1212 can be implemented by one or more integrated circuits, logic circuits, FPGAs, microprocessors, CPUs, GPUs, DSPs, and/or microcontrollers from any desired family or manufacturer. The programmable circuitry 1212 may be implemented by one or more semiconductor based (e.g., silicon based) devices. In this example, the programmable circuitry 1212 implements controller circuitry 800.

The programmable circuitry 1212 of the illustrated example includes a local memory 1213 (e.g., a cache, registers, etc.). The programmable circuitry 1212 of the illustrated example is in communication with main memory 1214, 1216, which includes a volatile memory 1214 and a non-volatile memory 1216, by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter data and/or commands into the programmable circuitry 1212. The input device(s) 1222 can be implemented by, for example, a sensor, a keyboard, a button, a mouse, a touchscreen, a trackpad, a trackball, and/or an isopoint device.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store firmware, software, and/or data. Examples of such mass storage discs or devices 1228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1232, which may be implemented by the machine readable instructions of FIG. 11, may be stored in the mass storage device 1228, in the volatile memory 1214, in the non-volatile memory 1216, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

From the foregoing, it will be appreciated that example systems, apparatus, articles of manufacture, and methods have been disclosed that monitor for errors/leaks and adjust a packing load for a control valve system in response to those detected errors/leaks. Disclosed systems, apparatus, articles of manufacture, and methods improve the efficiency of using a computing device by monitoring for emissions/leaks in the packing load and instructing a controller to adjust a packing load to reduce the emissions/leaks. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to control valves with adjustable valve packing are disclosed herein. Further examples and combinations thereof include the following:

Example 1 includes an apparatus comprising a valve including a valve body defining a fluid passageway between an inlet and an outlet, a flow control member in the fluid passageway, a stem coupled to the flow control member, a bonnet coupled to the valve body, the stem extending through a channel in the bonnet, a section of the channel forming a bore, the bore being threaded, and packing in the channel to form a seal between the bonnet and the stem, a worm wheel nut threadably engaged with the bore, the stem extending through an opening in the worm wheel nut, and a worm meshed with the worm wheel nut, the worm to rotate the worm wheel nut to cause the worm wheel nut to move and adjust a load on the packing.

Example 2 includes the apparatus of example 1, further including a packing load connector in the channel, the packing load connector engaged with the packing, wherein axial movement of the worm wheel nut causes the packing load connector to increase or decrease the load on the packing.

Example 3 includes the apparatus of example 2, further including a spring disposed around the packing load connector, the spring to dampen the load applied to the packing by the worm wheel nut.

Example 4 includes the apparatus of example 3, further including a load sensor between the spring and a shoulder of the packing load connector, the load sensor to measure the load applied to the packing.

Example 5 includes the apparatus of example 4, further including a thrust bearing between the spring and the load sensor.

Example 6 includes the apparatus of example 1, further including a stop pin extending through a wall of the bonnet and into a groove in the worm wheel nut.

Example 7 includes the apparatus of example 1, further including a motor with a drive shaft, the worm coupled to the drive shaft.

Example 8 includes the apparatus of example 7, further including an actuator to operate the valve, and a yoke to couple the actuator and the valve, the motor coupled to the yoke.

Example 9 includes the apparatus of example 7, further including at least one of a first emission sensor at a first location in the channel, a second emission sensor at a second location in the channel different than the first location, or a temperature sensor to measure a temperature of a fluid within the channel.

Example 10 includes the apparatus of example 9, further including controller circuitry to activate the motor to adjust the load on the packing based on output data provided by the at least one of the first emission sensor, the second emission sensor, or the temperature sensor.

Example 11 includes an apparatus comprising a valve including a valve body defining a fluid passageway between an inlet and an outlet, a flow control member in the fluid passageway, a stem coupled to the flow control member, a bonnet coupled to the valve body, the bonnet defining a channel, the stem extending through the channel, and packing in the channel to form a seal between the bonnet and the stem, and a motor to, when activated, change an axial load on the packing.

Example 12 includes the apparatus of example 11, further including a gear assembly operably connected to the motor, the gear assembly to apply the axial load on the packing.

Example 13 includes the apparatus of example 11, further including controller circuitry to control operation of the motor.

Example 14 includes the apparatus of example 13, wherein the controller circuitry is to activate the motor to change the axial load based on output data provided by at least one sensor.

Example 15 includes the apparatus of example 14, wherein the at least one sensor includes an emission sensor positioned to detect gaseous leaks in the packing in the channel.

Example 16 includes the apparatus of example 14, wherein the at least one sensor includes a temperature sensor to measure a temperature of a gas in the channel.

Example 17 includes the apparatus of example 11, further including a load sensor to detect the axial load applied to the packing.

Example 18 includes the apparatus of example 17, wherein the load sensor is in the channel.

Example 19 includes a method comprising accessing a parameter value from sensor data output by a sensor of a control valve system, the control valve system including a valve including packing, comparing the parameter value to a threshold, and in response to the parameter value satisfying the threshold, activating a motor to adjust a load on the packing.

Example 20 includes the method of example 19, wherein the sensor is an emissions sensor that measures emission in a stem channel of the control valve system.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   a valve including:
      a valve body defining a fluid passageway between an inlet and an outlet;
      a flow control member in the fluid passageway;
      a stem coupled to the flow control member;
      a bonnet coupled to the valve body, the stem extending through a channel in the bonnet, a section of the channel forming a bore, the bore being threaded; and
      packing in the channel to form a seal between the bonnet and the stem;
   a worm wheel nut threadably engaged with the bore, the stem extending through an opening in the worm wheel nut; and
   a worm meshed with the worm wheel nut, the worm to rotate the worm wheel nut to cause the worm wheel nut to move and adjust a load on the packing.

2. The apparatus of claim 1, further including a packing load connector in the channel, the packing load connector engaged with the packing, wherein axial movement of the worm wheel nut causes the packing load connector to increase or decrease the load on the packing.

3. The apparatus of claim 2, further including a spring disposed around the packing load connector, the spring to dampen the load applied to the packing by the worm wheel nut.

4. The apparatus of claim 3, further including a load sensor between the spring and a shoulder of the packing load connector, the load sensor to measure the load applied to the packing.

5. The apparatus of claim 4, further including a thrust bearing between the spring and the load sensor.

6. The apparatus of claim 1, further including a stop pin extending through a wall of the bonnet and into a groove in the worm wheel nut.

7. The apparatus of claim 1, further including a motor with a drive shaft, the worm coupled to the drive shaft.

8. The apparatus of claim 7, further including:

an actuator to operate the valve; and a yoke to couple the actuator and the valve, the motor coupled to the yoke.

9. The apparatus of claim 7, further including at least one of a first emission sensor at a first location in the channel, a second emission sensor at a second location in the channel different than the first location, or a temperature sensor to measure a temperature of a fluid within the channel.

10. The apparatus of claim 9, further including controller circuitry to activate the motor to adjust the load on the packing based on output data provided by the at least one of the first emission sensor, the second emission sensor, or the temperature sensor.

11. An apparatus comprising:

a valve including:

a valve body defining a fluid passageway between an inlet and an outlet;

a flow control member in the fluid passageway;

a stem coupled to the flow control member;

a bonnet coupled to the valve body, the bonnet defining a channel, the stem extending through the channel, a section of the channel forming a bore with an inner surface having first threading; and packing in the channel to form a seal between the bonnet and the stem;

a nut at least partially in the bore, the nut having an outer surface with second threading that is meshed with the first threading, the stem extending through an opening in the nut; and a motor to, when activated, rotate the nut to cause the nut to move axially in the bore and change an axial load on the packing.

12. The apparatus of claim 11, further including a gear assembly between the motor and the nut.

13. The apparatus of claim 11, further including controller circuitry to control operation of the motor.

14. The apparatus of claim 13, wherein the controller circuitry is to activate the motor to change the axial load based on output data provided by at least one sensor.

15. The apparatus of claim 14, wherein the at least one sensor includes an emission sensor to detect gaseous leaks in the packing in the channel.

16. The apparatus of claim 14, wherein the at least one sensor includes a temperature sensor to measure a temperature of a gas in the channel.

17. The apparatus of claim 11, further including a load sensor to detect the axial load applied to the packing.

18. The apparatus of claim 17, wherein the load sensor is in the channel.

19. A method comprising:

accessing a temperature value from sensor data output by a temperature sensor of a control valve system, the control valve system including a valve including packing in a channel of the valve, the temperature sensor to measure the temperature value of a gas in the channel;

comparing the temperature value to a threshold; and in response to the temperature value satisfying the threshold, activating a motor to adjust a load on the packing, wherein activating the motor causes a nut in the channel to rotate, and rotation of the nut moves a packing load connector that is engaged with the packing.

* * * * *